(12) United States Patent
Larson

(10) Patent No.: US 6,207,771 B1
(45) Date of Patent: Mar. 27, 2001

(54) METHOD FOR PRODUCING POLYMERS USING MICELLAR POLYMERIZATION

(75) Inventor: Eric H. Larson, Freehold, NJ (US)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

(21) Appl. No.: 09/422,439

(22) Filed: Oct. 21, 1999

Related U.S. Application Data

(62) Division of application No. 09/114,834, filed on Jul. 14, 1998, now Pat. No. 6,127,454.
(60) Provisional application No. 60/052,577, filed on Jul. 16, 1997.

(51) Int. Cl.$^7$ .................................................... C08F 2/00
(52) U.S. Cl. .......................... 526/79; 526/80; 526/213; 526/214; 526/215; 526/256; 526/292.95; 526/320
(58) Field of Search ................ 526/79, 80, 213, 526/214, 215, 256, 292.95, 320

(56) References Cited

U.S. PATENT DOCUMENTS

| | | |
|---|---|---|
| 2,100,900 | 11/1937 | Fikentscher ............................. 260/2 |
| 4,432,881 | 2/1984 | Evani ..................................... 252/8.5 |
| 4,617,362 | 10/1986 | Becker et al. ......................... 526/209 |
| 4,747,835 * | 5/1988 | Jacques et al. ....................... 526/258 |
| 4,831,092 * | 5/1989 | Bock et al. ........................... 526/258 |
| 4,835,234 * | 5/1989 | Valint et al. .......................... 526/258 |
| 4,892,916 * | 1/1990 | Hawe et al. .......................... 526/258 |

FOREIGN PATENT DOCUMENTS 2003406  5/1990  (CA) .

OTHER PUBLICATIONS

Compostional heterogeneity effects in hydrophobically associating water–soluble polymers prepared by micellar copolymerization, Butterworth Heinemann, Igor Lacik, Joseph Selb and Francoise Candau, Institut Charles Sadron (CRM–EAHP), 6 rue Boussingault, 67083 Strasbourg Cedex, France, Polymer vol. 36, No. 16, 1995, pp. 3197–3211.

Emulsion Polymerization, Odian, Principles of Polymerization, 3$^{rd}$ Ed. ISBN 0–471–61020–8, pp. 335–341 (no date).

Polymerization of Acrylamide, Candau, Y.S. Leong, in Physics of Amphiphiles, Micelles, Vesicles and Microemulsions, V. Degiorgio and M. Corti, Eds. North–Holland, Amsterdam, 1964, pp. 195–214.

Properties of Hydrophobically Associating Polyacrylamides Influence of the Method of Synthesis, Alain Hill, Francoise Candau, and Joseph Selb, Macromolecules 1993, pp. 4521–4532.

Kenitic Study of the Polymerization of Acrylamide in Inverse Microemulsion, Francoise Candau, and Yee Sing Leong, Centre de Recherches sur les Macromolecules CNRS, France, pp. 193–214, (no date).

* cited by examiner

*Primary Examiner*—Bernard Lipman

(57) ABSTRACT

A process for forming a hydrophobically modified water soluble or water dispersible polymer by utilizing a micellar polymerization technique comprising the steps of:

(1) providing a reaction medium including one or more water soluble or water dispersible monomers and one or more surface active agents or protective colloids;
(2) incrementally adding one or more ethylenically unsaturated monomers having hydrophobic properties to said reaction medium;
(3) initiating polymerization of said one or more water soluble or water dispersible monomers with said one or more ethylenically unsaturated monomers having hydrophobic properties; and
(4) continuing polymerization of said one or more water soluble or water dispersible monomers with said one or more ethylenically unsaturated monomers having hydrophobic properties while incrementally adding said one or more ethylenically unsaturated monomers having hydrophobic properties to said reaction medium is provided.

22 Claims, No Drawings

METHOD FOR PRODUCING POLYMERS USING MICELLAR POLYMERIZATION

This application is a divisional of application Ser. No. 09/114,834, filed Jul. 14, 1998, now U.S. Pat. No. 6,127,454, claiming priority from provisional application No. 60/052,577, filed Jul. 16, 1997.

BACKGROUND OF THE INVENTION

1. Field of the Invention

The present invention relates to a method for forming polymers wherein a micellar polymerization method is utilized. More specifically, the method comprises the incremental addition of a hydrophobic monomer to a reaction medium which includes both a water soluble monomer and a surface active agent, so that hydrophobic monomer is present in a constant concentration throughout the polymerization process.

2. Technology Description

Micellar polymerization is one of several methods that can be used to produce water soluble or water dispersible polymers containing hydrophobic structural features. These polymers, through complex interactions with themselves, colloids, surfaces, interfaces, solvents, electrolytes, and associative structures such as surfactant micelles and vesicles or natural polyelectrolytes with important tertiary structures such as proteins and enzymes are of great technological and economic interest.

Micellar polymerization consists of copolymerizing a mixture of hydrophilic and hydrophobic monomers by a chain growth method wherein the bulk of the monomers are water soluble, a surfactant is used to obtain a thermodynamically stable micellar solution of the hydrophobic monomers, and the resulting product is substantially a water soluble or water dispersible polymer either dissolved in water or dispersed in water.

Micellar solutions are distinguishable from microemulsions in that they can be formed at any surfactant concentration above the critical micelle concentration and do not depend on achieving the very low surface tensions necessary for the formation of a thermodynamically stable microemulsion. The main requirement for the formation of a micellar solution is that the solute be soluble to some extent within the micelle interior, which may include the transition or palisades layer near the surface of the micelle.

A micellar solution is distinguishable from a conventional emulsion in that in the micelle interior there is no essentially homogeneous phase of the solute, the micelle has properties similar to pure surfactant micelles in terms of very small physical size, contain a small number of molecules, often on the order of 100 to 1000, are generally too small to refract light to provide the characteristic white appearance of an emulsion, and possess a very small mean lifetime, on the order of milliseconds. Micellar solutions are microheterogeneous systems that are characteristically isotropic, optically transparent and thermodynamically stable.

Evani (U.S. Pat. No. 4,432,881) and Lacik et al. (Compositional Heterogeneity Effects in Hydrophobically Associating Water-Soluble Polymers Prepared by Micellar Copolymerization, POLYMER, Volume 36, Number 16, 1996, pp. 3197–3211) describe examples of this technique, the resulting products and some of the limitations thereof. This synthesis method is distinct from conventional polymerization processes such as emulsion polymerization where the bulk of the monomers are water insoluble (Hill, Candau, and Selb, Macromolecules, 1993 vol. 26, p 4521; Odian, Principles of Polymerization, 3rd Edition, p335 ff.), or from inverse microsuspension polymerizations (Larson, U.S. Pat. No. 4,617,362) where the continuous phase is immiscible with water, or from polymerizations in microemulsions (Candau, Kinetic Study of the Polymerization of Acrylamide in Inverse Microemulsions, Journal of Polymer Science, Vol. 23, p 193–214, 1985).

Applications of the class of materials produced by micellar polymerization include associative thickeners having the ability to control the rheology of a variety of systems including cosmetics, paints and other aqueous systems, where flow behavior influences the ease and effectiveness of application. Rheology enhancement can also be useful in improving the apparent skin feel or richness of a formulation. Rheology can also be important in enhancing the stability of a colloidal system. Other applications for the products of micellar polymerization include compositions that enhance the foamability of surfactant systems, (see, for example U.S. application Ser. No. 08/573,794) modify the solution behavior of the polymer to provide control of the characteristics of the polymer on exposure to environmental variables (so called 'smart polymers') and provide associative structures with other materials such as physiologically active compounds to control the rates at which they become biologically available. Applications in water treatment by providing a polymer with both flocculant and sorptive properties are possible. Other applications of products possible from the practice of this technology may include development of products that provide tailored surface substantivity, or provide for modification of the surface properties of the materials to which they may become adsorbed to. Polymers of this type have been shown to be particularly effective in solubilizing organic materials in aqueous solutions.

Polymers with surface active properties such as those which can be produced by micellar polymerization are desirable for use in cosmetic formulations as compared to surfactants because of their increased mildness as a result of having higher molecular weights as compared with surfactants. Micellar structures derived from modified polymers can have relaxation times on the order of 10–100 seconds, where surfactant micelles have relaxation times on the order of milliseconds. This can provide kinetically stabilized structures impossible with surfactant micelles. Such structures may be useful for controlling the release of active ingredients, or as microenvironments for carrying out chemical reactions in aqueous media, substituting for less friendly solvent based systems.

Emulsions, particularly complex systems wherein an inner aqueous phase is dispersed in an oil phase which is further dispersed in an external aqueous phase (so-called w/o/w systems) may be stabilized by polymers of this type where surfactant based systems would fail as the polymeric surfactant must desorb many segments from the interface to relocate to migrate between inner and outer surfaces where a surfactant would easily migrate, thereby destabilizing the inner emulsion. It is also possible by modification of a polymer to obtain compatibility with a surfactant system due to elimination of the phase segregation effects that often occur when polymer/surfactant blends are formed. Modified polymeric systems may undergo self-assembly providing utility in applications such as nanolithography and nanofabrication. Hydrophobically modified polymers may form associative structures with biologically active compounds such as enzymes, preserving, enhancing or enabling activity in situations that would normally inactivate the enzyme.

Other applications may become apparent to readers familiar with other areas of technological specialization.

Until now the practical use of micellar polymerization has been hampered by several technological and economic problems. The composition drift that occurs during polymerization due to the enhanced reaction rate of the solubilzed monomer in its micellar environment introduces inhomogenaeties into the polymer structure (The Candau reference provides some discussion of this). For many applications of these types of polymers, the comonomer sequence distribution may have a significant effect on the performance of the polymeric material in question. Another major limitation of existing micellar polymerization technology is the problem of the high ratios of surfactant to hydrophobic monomer typically needed to obtain a micellar solution, from 15/1 to 70/1 and to control the length of the hydrophobic monomer sequence. This may prevent use of the polymer both through the cost of the surfactant, and through interference from the surfactant with the intended end use of the polymer. Finally, because of the need to closely match monomer reactivities in order to control composition drift, the practitioner is limited in his choices of monomers, and thus the potential range of technological applicability of this method.

Alternatives to micellar polymerization, such as the use of polymerizable surfactants instead of hydrophobic monomers in micellar solutions can sometimes be used, but these too have their limitations. In general polymerizable surfactants are available in a much more limited range of composition and structure, and are as well generally much more costly than the chemically simpler hydrophobic monomers available in commerce. Therefore the cost and availability problems that limit the range of potential applicability of copolymerizations using this alternative are obvious.

Another route that can be used to produce polymers of this type is by post-reacting either a hydrophobic or hydrophilic species with the opposite type of polymeric species. This requires the polymer and modification group involved have appropriate reactivities, that the polymeric solution is in a physical state conducive to the mixing and heat transfer processes that might be required, that the solvent does not interfere with the intended reaction, and that the resulting distribution of the modifying agent can be made appropriate to the intended application.

Another methodology, that of conducting polymerization in a solvent of properties intermediate to water and the desired hydrophobic material as to provide mutual solubility can be envisioned. Such solvents may be mixtures of water and other components. However such solvents generally have a number of undesirable properties, including high cost, toxicity, flammability, formation of side products with the reactants, chain transfer activity, and a negative environmental impact. In many cases the use of solvents may be restricted by government legislation. It may be necessary to recover these solvents from the product polymer for one or more of these reasons, in which case the additional processing and equipment requirements provide a different scientific and economic barrier to the use of this technology. Solvent recovery from viscous polymer solutions can be a severe engineering problem, and finding processing conditions that do not also lead to polymer degradation may be very difficult or impossible. In many cases it is possible to find a solvent for the desired monomers, but not for both the monomers and product polymer.

Canadian Patent Application 2,003,406 provides an example of the use of aqueous/solvent based systems as a route to hydrophobically modified water soluble polymers. The systems disclosed do not provide a methodology for effective incorporation of higher alkyl methacrylates due to the limited solubility of these monomers in aqueous/alcoholic systems. Polymerization of such higher alkyl monomers in these solvents result in mixtures of a suspension polymer containing the hydrophobic monomers and a water soluble polymer with very minor or insignificant hydrophobic modification. This mixture will not have the valuable performance characteristics of a hydrophobically modified water soluble polymer.

It has long been known (U.S. Pat. No. 2,100,900) that the practice of feeding a more reactive monomer into a reaction system can be used to control the change in composition that often occurs when two monomers are being polymerized. For example, many commonly practiced emulsion polymerizations are accomplished in this manner. However it has not been hitherto appreciated that this technique can be used to overcome some problems associated with the micellar polymerization process, and provide a number of beneficial, and in some cases unobvious results. In particular this method is possible because of the competitive kinetics of transfer to micelles ($10^{-7}$ sec) vs. chain growth addition to polymer ($10^{-4}$ sec).

Despite the above teachings, there still exists a need in the art for producing a hydrophobically modified water soluble or water dispersible polymer wherein a micellar polymerization technique is utilized which does not suffer from the above described defects.

BRIEF SUMMARY OF THE INVENTION

In accordance the present invention, an improvement to the general technique of micellar polymerization which overcomes the problems as discussed above, and provides novel products which can be used for multiple applications is provided. More specifically, the improvement comprises incrementally feeding hydrophobic monomer into a polymerization reaction medium which includes both one or more water soluble or water dispersible monomers and one or more surface active agents.

Accordingly, one embodiment of the present invention provides a process for forming a hydrophobically modified water soluble or water dispersible polymer by utilizing a micellar polymerization technique comprising the steps of:

(1) providing a reaction medium including one or more water soluble or water dispersible monomers and one or more surface active agents or protective colloids;

(2) incrementally adding one or more ethylenically unsaturated monomers having hydrophobic properties to said reaction medium;

(3) initiating polymerization of said one or more water soluble or water dispersible monomers with said one or more ethylenically unsaturated monomers having hydrophobic properties; and (4) continuing polymerization of said one or more water soluble or water dispersible monomers with said one or more ethylenically unsaturated monomers having hydrophobic properties while incrementally adding said one or more ethylenically unsaturated monomers having hydrophobic properties to said reaction medium.

The term "incrementally adding" defines any form of addition of a small amount of the total monomers having hydrophobic properties to the reaction medium over an extended period of time until all of such monomers have been added to the reaction medium. This includes cyclic additions, interrupted additions, combinations of the above and the like. The incremental addition results in the addition of hydrophobic monomer into a reaction medium even after some polymerization had commenced. Preferably, the addition of the monomer(s) is continuous and at a constant level over a period of time so that the concentration of the monomer(s) remains constant over the entire polymerization procedure.

Another embodiment of the present invention comprises the product produced by the above process.

Still another embodiment of the present invention provides a method for using the product produced by the inventive process in any of the following applications: rheology modification, deinking, foam enhancement, cosmetics and personal care compositions, coating compositions, water treatment, nanolithography, nanofabrication, control release compositions, biologically active compositions, binders and dispersants.

An object of the present invention is to provide a novel process for producing hydrophobically modified water soluble or water dispersible polymers.

Still another object of the present invention is to provide novel hydrophobically modified water soluble or water dispersible polymers.

A further object of the present invention is to provide methods for using said novel hydrophobically modified water soluble or water dispersible polymers.

These, and other objects, will readily be apparent to those skilled in the art as reference is made to the detailed description of the preferred embodiment.

DETAILED DESCRIPTION OF THE PREFERRED EMBODIMENTS

In describing the preferred embodiment, certain terminology will be utilized for the sake of clarity. Such terminology is intended to encompass the recited embodiment, as well as all technical equivalents which operate in a similar manner for a similar purpose to achieve a similar result.

The instant invention provides a process for forming a hydrophobically modified water soluble or water dispersible polymer by utilizing a micellar polymerization technique. More specifically, the process utilizes a process step wherein the one or more ethylenically unsaturated monomers having hydrophobic properties is incrementally fed into the polymerization reactor over the course of the polymerization. Utilizing this procedure allows for the production of polymers having outstanding properties because of the minimal amount of surface active agent present in the reaction medium.

The first step of the present invention comprises providing a reaction medium including one or more water soluble or water dispersible monomers and one or more surface active agents. In practice, water is the preferred medium for the polymerization reaction although water miscible solvents, such as glycols or alcohols or mixtures of water with water miscible solvents may be selected.

The water soluble or water dispersible monomer to be selected is any that can be used in micellar polymerization as long as the monomer is soluble or dispersible in an aqueous environment. Preferably these monomers are ethylenically unsaturated monomers which contain one or more vinyl groups.

Specific examples of water soluble or water dispersible monomers that can be selected include, but are not limited to, vinyl carboxylic acids such as itaconic, crotonic, malonic, acrylic, methacrylic and maleic acid (including anhydrides such as maleic anhydride and citraconic anhydride, and acid salts), sulfonic acid (including acid salt) monomers such as 2-acrylamidomethylpropanesulfonic acid or 1-allyloxy-2-hydroxypropyl sulfonic acid, polar monomers such as acrylamide, methacrylamide, the various N substituted derivatives of these amides, N-vinyl pyrrolidone, N-vinyl formamide, various cationic monomers including diallyldimethylammonium chloride or sulfate, methacrylamidopropyltrimethyl-ammonium chloride, methacryloylethyltrimethylamine, the various alkyl or aryl sulfate or halogenated quaternary derivatives thereof, and the acryloyl analog of this family of monomers. Other water soluble or water dispersible monomers are considered known to one skilled in the art. Mixtures of water soluble or water dispersible monomers are expressly contemplated.

Also present in the reaction medium is one or more surface active agents or protective colloids. The primary consideration in selecting the surface active agent or protective colloid is its ability to solubilize the hydrophobic monomer which is to be added incrementally to the reaction medium. A further consideration is to maintain the level of surface active agent at a minimal amount so that it cannot interfere with the functional properties of the resulting polymer. These materials are present in amounts ranging from about 0.1 to 5 weight percent of the reaction medium, with amounts ranging between about 0.2 to 2.0 weight percent being more preferred. The actual amount added will depend on the amount of hydrophobic monomer present in the reactor during polymerization and the efficiency of the surface active agent in solubilizing the hydrophobic monomer. The use of minimal amounts of surface active agent in the reaction medium distinguishes the inventive process from conventional micellar polymerization processes.

In practice, it is preferable that the one or more surface active agents comprise one or more surfactants. The surfactants selected for use in producing such formulations are considered within the skill of the artisan and can be selected from nonionic, anionic, cationic, amphoteric and zwitterionic surfactants. Mixtures of the above surfactants may also be selected.

Examples of nonionic surfactants which may be selected include fatty acid amides, alkoxylated fatty alcohol amines, fatty acid esters, glycerol esters, alkoxylated fatty acid esters, sorbitan esters, alkoxylated sorbitan esters, alkylphenol alkoxylates, aromatic alkoxylates and alcohol alkoxylates.

Examples of anionic surfactants which may be selected include alkyl sulfates (alkyl is a fatty alkyl or alkylaryl group), ether sulfates, alkyl sulfonates, sulfosuccinates, sulfosuccinamates, naphthalene formaldehyde condensates, isethionates, taurates, phosphate esters and ether carboxylates.

Examples of cationic surfactants which may be selected include cationic quaternaries such as imidazolines, arylalkyl quaternary compounds and aromatic quaternary compounds, amine oxides, and alkoxylated amines.

Examples of amphoteric or zwitterionic surfactants which may be selected include betaines, sultaines, glycinates, amphoteric imidazoline derivatives and aminopropionates.

All of the above types of surfactants are commercially available and sold by Rhone-Poulenc Inc.

More specific examples of suitable surfactants which may be selected include ammonium lauryl ether sulfate, sodium lauryl ether sulfate, sodium dodecylbenzene sulfonate, octyl phenol ethoxylates (30–50 moles of ethylene oxide), nonyl phenol ethoxylates (30–50 moles of ethylene oxide), sodium lauryl sulfate, and phosphate esters such as ammonium or sodium salts of poly(oxy-1,2-ethanediyl), $\alpha$-(nonylphenol)-

ω-hydroxy-phosphate,poly(oxy-1,2-ethanediyl),α-phenol-ω-hydroxy-phosphate and poly(oxy-1,2-ethanediyl),α-(octylphenol)-ω-hydroxy-phosphate. These materials are commercially sold by Rhone-Poulenc Inc. under the trade names Abex JKB, Abex VA-50, Abex 2050, Abex 23S, Alkasurf NP-40, Rhodasurf RP-710, Sipon LSB, Alkasurf NP-50, Rhodocal DS-4, Rhodafac R9-25A, Rhodasurf RE-610 and Rhodasurf RE-960.

Examples of protective colloids which may be selected include poly[vinyl alcohol], hydroxyethyl cellulose, poly[vinyl pyrrolidone], sodium polyacrylate and condensation products of polyethylene glycol with fatty acids, long chain alkylene or polyhydroxy fatty acids. Examples of the condensation products are sold by ICI under the Hypermer name.

In particularly preferred embodiments, no ethylenically unsaturated monomers having hydrophobic properties are initially present in the reaction medium.

To this reaction medium is added incrementally one or more ethylenically unsaturated monomers having hydrophobic properties. The selection of the hydrophobic monomer is considered within the skill of the artisan but it must be hydrophobic in its monomer form and capable of reacting with the water soluble or water dispersible monomer in the reaction medium to form a water soluble or dispersible polymer which is hydrophobically modified. Hydrophobic monomers that can be selected include styrene, acetoacetoxyethylmethacrylate, vinyl acetate, alkyl or alkylaryl alcohol esters of acrylic or methacrylic acid (specifically including those wherein alkyl represents a straight, branched or cyclic group, optionally substituted, containing between 1 and about 30 carbon atoms), butadiene, vinyl chloride, acrylonitrile, 1-vinylnaphthalene and p-methoxystyrene. The use of mixtures of these polymers is expressly contemplated.

The incremental feeding of the hydrophobic monomer may be in the form of bulk hydrophobic monomer, or may be in the form of an emulsion of the hydrophobic monomer system, said emulsion optionally stabilized with a surface active material, or may be in the form of a micellar solution of the hydrophobic monomer system. Feeding is conducted on an incremental basis in an attempt to maintain the concentration of the hydrophobic monomer as constant as possible throughout the entire polymerization process. In the embodiment where the hydrophobic monomer is added in emulsion form having a surface active material, any of the above defined surfactants and/or protective colloids may be selected provided that they are compatible with the hydrophobic monomer and can disperse it in the continuous phase of the feed emulsion.

In practice, the amount of the water soluble or water dispersible monomers exceeds that of the hydrophobic monomer. In a preferred embodiment, the weight ratio of water soluble or water dispersible monomers to hydrophobic monomer(s) is at least greater than 55:45, with ratios of between 70:30 and 99:1 being particularly preferred.

The feed containing the one or more hydrophobic monomers may also contain other components, including water soluble monomers, chain transfer agents, branching or crosslinking agents, chelants, buffers, polymerization initiators, and similar components known to one skilled in the art as beneficial to the technological application under consideration and the promotion of the intended polymerization and control of the structure of the desired end product. These optional materials may alternatively be already present in the reaction medium or fed independent from the hydrophobic monomers. Incorporation of water soluble monomers into the feed along with insoluble monomers provides the ability to control reaction rates that include both fast reacting soluble or dispersible monomers, fast reacting insoluble monomers, as well as slower reacting monomers that are accelerated by concentration in a hydrophobic domain.

Once the hydrophobic monomer is fed into the reaction medium containing the water soluble or water dispersible monomer, polymerization is initiated. Polymerization can be initiated by the application of environmental forces, for example, light or heat, but, in the preferred embodiment, initiation occurs by the addition of a chemical polymerization initiator.

The polymerization initiator may take the form of many known initiators such as azo, peroxide, persulfate, perester and redox initiators. The amount of initiator added to the solution typically ranges from between about 0.0025 to about 10 weight percent of the reaction medium with amounts ranging from about 0.1 to about 0.5 weight percent being particularly preferred. The amount of initiator added will vary over these ranges depending on the desired molecular weight of the polymer and the proposed end use for such polymer.

Particularly preferred is the use of persulfate initiators such as sodium persulfate, potassium persulfate, ammonium persulfate and the like, with sodium or ammonium persulfate being particularly preferred. Other free radical initiators which may be selected include peroxide materials such as benzoyl peroxide, cumene hydroperoxide, hydrogen peroxide, acetyl peroxide, lauroyl peroxide, peresters such as t-butylperoxypivalate, a-cumylperoxypivalate and t-butylperoctoate, and azo (azobisnitrile) type initiators (water or oil soluble) such as 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl methoxyvaleronitrile) and 2,2'-azobis-(2-amidinopropane) hydrochloride. The initiators may be added in an inert solvent such as water or acetone.

Polymerization continues until all of the monomer(s) and initiator have been added into the reaction vessel and until nearly all of the monomer feed has been converted to a polymerized form. Polymerization is generally continued until a high conversion is achieved as in excess of 80 percent, desirably at least 90 or 95 percent, and preferably at least 98 percent or even complete conversion.

Depending on the monomers selected for polymerization, the polymerization reaction can take place at temperatures ranging from about 20° C. to about 200° C., with a reaction temperature of between about 50° C. and about 150° C. being more common.

Once polymerization has completed, the polymer can either be recovered using means known in the art such as filtering, centrifuging and the like or the resulting polymer solution may be used in one or more technical applications.

It is believed that in conducting the polymerization in accordance with the inventive method the tendency for micellar composition drift to occur can be controlled by maintaining a reduced, constant concentration of the faster reacting micellar solution of hydrophobic monomer. In addition, in the cases where a bulk hydrophobic monomer or emulsion of the hydrophobic monomer is fed to the reactor, it is not necessary to use a quantity of surface active agent in the reactor so as to form a micellar solution of the total quantity of hydrophobic monomer incorporated into the final product. Instead, the quantity of surface active agent used may be selected so as to provide a micellar solution only for the unreacted quantity of hydrophobic monomer present in the reaction medium at any given time. This amount of surface active agent will be substantially lower due to the fact that the much of the hydrophobic monomer will either be incorporated into the polymer, or be in the form of a bulk or emulsion in the feed at any given time. Minimizing the amount of surface active agent used can result in its not interfering with the functional properties of the resulting polymer.

In the embodiment where the hydrophobic monomer is fed in emulsion form, the surfactant used to emulsify the hydrophobic feed monomer need not be the same as that used to form the micellar solution, however it should be selected as to be compatible with both the formation of such a micellar solution in the reactor, and also be compatible with effective polymerization, and the intended use of the product. Alternatively, mechanical dispersion or feeding the hydrophobic monomer as-is can be practiced if it is not fed in emulsion form. Surfactant levels, types and reaction rates are selected to minimize the formation of dispersed homopolymeric hydrophobe consistent with the intended end use of the product.

The resulting product produced by the inventive polymerization method may be used in any number of practical applications. Such applications include, but are not limited to rheology modification, deinking, cosmetics and personal care compositions, foam enhancing compositions, coating compositions, water treatment, nanolithography, nanofabrication, control release compositions, biologically active compositions, binder compositions and dispersant compositions.

One potential application for the product of the inventive process is as a foam enhancer. It has been difficult to obtain improved foam qualities by the use of additives. The product of the present invention can be used as a foam quality additive. Suitable background information as to the value and difficulty of obtaining improved foam quality through additives is discussed in U.S. patent application Ser. No. 08/573,794. To the extent necessary for completion, this reference is hereby incorporated by reference.

Another potential application for the product of the inventive process is as a viscosity enhancer. In the case of viscosity enhancement, the Evani patent (U.S. Pat. No. 4,432,881) discusses the need for additive chemicals which possess this attribute. To the extent necessary for completion, this reference is hereby incorporated by reference.

Still another potential application for the product of the inventive process is as a deinking chemical, and more specifically as a chemical used in the removal of flexographic (waterborne) inks while using a flotation or hybrid flotation/wash deinking process. The details on removing flexographic inks is discussed in greater detail in U.S. patent application Ser. No. 08/573,710. To the extent necessary for completion, this reference is hereby incorporated by reference.

In order to demonstrate the utility of this invention, three applications are investigated; production of a polymer solution with enhanced thickening properties, demonstration of the foam enhancement properties of the same product, and application of the invention to the area of flotation deinking in a paper recycling process. The benefits of this improvement in micellar polymerization technology become apparent on consideration of the following examples.

The invention is described in greater detail, by the following non-limiting examples. All parts listed are by weight unless indicated to the contrary.

EXAMPLE 1

A 1 liter electrically heated resin flask equipped with a temperature sensor, condenser cooled by tap water, agitator, and tubing for introduction of purge gasses and feed liquids is used as a reaction vessel. Feed solutions are introduced into the reactor by positive displacement metering pumps.

Reaction temperature is controlled at 90° C. Feed solutions are pumped into the reactor over a 4 hr period. After the feed solution addition is complete, the reactor is maintained at 90° C. for an additional half hour. During the reaction a nitrogen purge is applied at a flow rate of about 0.5 L per minute.

For this example, two feed solutions are introduced into the reactor, one a dilute solution of a free radical polymerization initiator, the other a monomer solution containing both a hydrophilic and a hydrophobic monomer. The monomer feed is gently mixed with a magnetic stirrer to prevent sedimentation during the reaction time.

A reactor charge is prepared by forming a solution from the following ingredients:

77.58 parts of 62% diallyldimethylammonium chloride monomer, 102.4 parts deionized water, 0.096 parts of ammonium persulfate, 0.02 parts of 40% solution of pentasodium diethylenetriaminepentaacetic acid, and 20 parts sodium lauryl sulfate.

The initiator feed solution is prepared from 50 parts of deionized water and 1.152 parts ammonium persulfate.

The monomer feed is prepared from:

3.25 parts lauryl methacrylate, 91.68 parts acrylamide, 124 parts deionized water, 31 parts of sodium lauryl sulfate.

The above solution is homogenized for 5 minutes using a laboratory tissue homogenizer.

After polymerization, a white viscous polymer solution is obtained and is stable to phase separation in storage for greater than 3 months. The solids content is determined by oven drying at 130° C. for two hours and is 22%.

EXAMPLE 2

The procedure of example 1 is used, except the ingredients are:

Reactor Charge:

107.68 parts of 62% aqueous solution of diallyldimethylammonium chloride, 2.0 parts of tallow amine ethoxylate (15 moles EO), 90.16 parts deionized water, 0.15 parts of a 10% aqueous solution of diethylenetiaminepentaacetic acid, pentasodium salt which is neutralized to pH 6.8–7.0 with HCl.

Monomer Feed:

1.96 parts isodecyl methacrylate, 1.96 parts lauryl methacrylate, 1.96 parts lauryl acrylate, 52.5 parts of a 51% aqueous solution of acrylamide, 0.25 parts of tallow amine ethoxylate (15 moles EO), 191.1 parts deionized water.

The initiator feed solution is prepared from 50 parts of deionized water and 0.32 parts ammonium persulfate.

The monomer feed is homogenized with a laboratory tissue homogenizer for 5 minutes prior to use.

After reaction a slightly viscous yellowish-white opaque solution is obtained. The viscosity of the product is 250 cps. as determined by a Brookfield LVT Viscometer fitted with a No. 2 spindle at 30 rpm. The solids content is determined by oven drying at 130° C. for two hours and is 22%. This material is physically stable on storage for two weeks. The resulting product is soluble in dimethyl sulfoxide, forming a clear solution. This indicates the incorporation of the hydrophobic monomer in the polymer backbone.

Comparative Example 3

The procedure of example 1 is used, except that the surfactant is not present in either the Reactor Charge or Monomer Feed. The ingredients are:

Reactor Charge:

77.58 parts of a 62% aqueous solution of diallyldimethylammonium chloride, 0.096 parts of ammonium persulfate, 124 parts of deionized water, 0.366 parts of a 2% aqueous solution of diethylenetiaminepentaacetic acid, pentasodium salt.

Monomer Feed:

3.25 parts lauryl methacrylate, 91.68 parts of a 51% aqueous solution of acrylamide and 192 parts deionized water.

The initiator feed solution is prepared from 50 parts of deionized water and 1.152 parts ammonium persulfate.

The monomer feed is homogenized with a laboratory tissue homogenizer for 5 minutes prior to use.

The pH of both the monomer feed and reactor charge is adjusted to be in the range of 6.8 to 7.0.

After reaction a slightly viscous yellowish-white opaque solution is obtained. This material separates over two days into a clear aqueous polymer solution with a white opaque layer at the top of the container indicating that the hydrophobic monomer is not successfully incorporated into the water soluble polymer. Samples of the white layer, when added to dimethylsulfoxide, form turbid solutions. The solids content is determined by oven drying at 130° C. for two hours and is 22%. This example suggests the need for the presence of a surface active agent in the reaction charge, and preferably, also in the monomer feed.

Comparative Example 4

This example is provided to demonstrate an example of a conventional micellar polymerization wherein the hydrophobic monomer and a high amount of surface active agent are present in the reactor. The procedure of example 1 is used, except the ingredients are:

Reactor Charge:

109.74 parts of 62% aqueous solution of diallyldimethylammonium chloride, 124 parts of deionized water, 0.366 parts of a 2% aqueous solution of diethylenetiaminepentaacetic acid, pentasodium salt, 60 parts of tallow amine ethoxylate (15 moles EO), 1.96 parts lauryl methacrylate, 1.96 parts of lauryl acrylate, 1.96 parts isodecyl methacrylate.

Monomer Feed:

78.68 parts of 51% aqueous solution of acrylamide, 185 parts deionized water.

The initiator feed solution is prepared from 50 parts of deionized water and 0.32 parts ammonium persulfate.

The monomer feed is mixed with a low speed magnetic stirrer until a clear yellowish solution is formed (about 1 hr) prior to use.

After reaction a slightly viscous yellowish white opaque solution is obtained. The viscosity of the product is 220 cps.

as determined by a Brookfield LVT Viscometer fitted with a No. 2 spindle at 30 rpm. The solids content is determined by oven drying at 130° C. for two hours and is 28%. This material is physically stable on storage for 2 weeks.

EXAMPLE 5

Comparative Viscosities of Example 1 and Comparative Example 3

A Brookfield LVT viscometer fitted with a No. 2 spindle is used to measure the relative viscosities of the samples produced in Example 1 and Comparative Example 3. The Comparative Example 3 sample is obtained by mixing the separate layers of the composition to make them temporarily miscible prior to viscosity testing. The results are shown in the attached Table.

| Rotational Speed (RPM) | Ex. 1 Reading | Comp. Ex. 3 Reading |
| --- | --- | --- |
| 30 | Off Scale | 13 |
| 12 | 61.6 | 6 |
| 6 | 34.2 | 2.8 |
| 3 | 23 | 1.4 |
| 1.5 | 19 | — |
| 0.6 | 12 | — |
| 0.3 | 8.4 | — |

EXAMPLE 6

Foam Enhancement of Example 1 Composition

In order to demonstrate the foam enhancing capabilities of the product manufactured in Example 1, two solutions of a linear alcohol ether sulfate surfactant at 8.6 parts in 490 parts of water are prepared. To one of the solutions 2.5 parts of the polymer solution produced in Example 1 is added. The other solution has no added polymer solution and is considered a control. The two solutions are passed through a C & R Supply Inc. (of Sioux Falls, S.D.foam marker generator, which essentially consists of a positive displacement pump operating at 0.075 gallons per minute, with air injection at 0.44 cubic feet per minute, said air-water mixture passing through a porous sponge to generate a high quality foam.

Samples of the resulting foams are placed in rectangular glass cells, and observed with a video camera under magnification. Video prints of the foam in the glass cell are taken at 1, 5 and 10 minutes, and the number of bubbles within a section of the frame are counted in order to provide a comparison of the foam quality vs. time for the various samples. A higher number of bubbles is an indicator of a superior foam.

| Time (min) | Surfactant Only (Control) | With Example 1 Added |
| --- | --- | --- |
| 1 | 180 | 210 |
| 5 | 37 | 75 |
| 10 | 18 | 35 |

Thus the addition of a minor amount of surface active polymer provides a significant enhancement of the foam quality of this surfactant system.

EXAMPLE 7

Comparative Deinking Performance

In order to evaluate the potential use of these polymers in paper recycling, a series of ink removal experiments are conducted using a flotation procedure.

Flotation Procedure
Overview

Old magazine pages are shredded by two passes through an office shredder and are then pre-pulped in a Waring Lab blender at low speed and low consistency in order to assure good defibering.

Similarly, shredded newsprint is defibered in a Kitchen-Aid mixer with an anchor style beater with the magazine pulp from above and is added to the mixer. Any pulping chemicals are normally added at this point in the process. A water bath is used to keep the Kitchen Aid bowl at a constant temperature.

The resulting pulp is diluted to float cell use concentrations in a carboy. The carboy is heated to maintain at a constant temperature.

A 1 liter flotation cell is used with a Denver D-1 mixer to simulate commercial scale flotation.

The following measurements of the flotation process are reported:

A). Filter pad brightness
B). Float cell reject fiber content (for yield)
C). Handsheet brightness Procedure Shred paper samples in office shredder before day of experiment. Turn on Kitchen-Aid water bath and allow to reach operating temperature.

Weigh paper samples and add newsprint to mixer bowl and magazine to blender jar. Tare reject containers.

Add required magazine and hot water to blender. Mix for four (4) thirty second intervals with about 5 second wait periods between cycles to allow trapped air to escape.

Mix treatment chemicals in 50 cc of water, q.v. to 100 cc. Add magazine pulp and chemicals to Kitchen-Aid bowl. Pulp at low speed until mixed (about 1 minute) and at medium speed for 5 minutes.

Dilute pulp as required in carboy, and mix.

Add required amount of diluted pulp to float cell. Add any flotation chemicals and mix according to instructions.

Insert Denver mixer into cell so that impeller is barely off the bottom of the cell, and turn on. Float for required period of time with specified air injection. Scrape foam into reject container using spatula along lip of front of float cell.

Weigh reject container and record tare and gross weight.

Vacuum filter 300 mL of float cell contents (be sure to mix to prevent fiber separation) through bilibous filter paper. Turn on vacuum AFTER adding pulp to Buchner funnel to prevent filter paper adhesion.

Collect a sample of filtrate and measure filtrate turbidity in Hach Nephelometer.

Peel filter paper from brightness pad and place plate against top of pad. Stack between sheets of blotter paper. When 10 pads are collected, press in sheet press at 45 psi for 90 seconds. Place in drying rings and allow to dry overnight. Label the blotter paper sheets.

Vacuum filter rejects in same manner, and place pad in oven overnight for drying at 103–105° C. Weigh dry pad next day.

Wash float cell and Denver mixer for next run.

Filter Pad Brightness Measurement

Allow Handibrite to warm up for 5 minutes. Calibrate the Handibrite brightness (reflectometer) meter using the ceramic standards.

Cut brightness pad into 7 equal pie shaped segments using template. Stack segments maintaining pad top-bottom orientation, and use Handi-Bright reflectometer to measure the brightness of each segment at the center of the segment. Record the measurements. Repeat the measurements for the reverse side of the segments.

Example Experiment 45 parts of magazine fiber are added to a blender with 750 parts hot tap water. Blend for 2 minutes in Waring Blender. Add to Kitchen Aid mixer. Also add to Kitchen Aid mixer 45 parts flexographic printed Newsprint and 60 parts lithographically printed Newsprint.

Pulping Chemicals are as follows:
3 parts 50% Hydrogen Peroxide
4.5 parts Type N Sodium Silicate
2 parts 10% Surfactant Solution
1.35 parts 50% NaOH solution Add above to 50 ml hot tap water and q.v. with water to 100 parts. Add to Kitchen Aid Mixer.

Blend in Kitchen Aid Mixer for 5 minutes. Measure pulp pH.

Dilute to 1.2% fiber content in carboy with hot tap water. Mix for 20 minutes with 3" radial flow Rushton-style turbine at 700 RPM. Run hot tap water on outside of container to maintain temperature.

Add 1 liter of 1.2% material to 1 L float cell. Measure pulp pH. Add in flotation chemicals and mix for 3 minutes with 1.5" marine propeller at 300 RPM using lab mixer. Float in Denver Cell for 3 minutes at 1200 rpm with air cock wide open, collecting rejects during flotation period.

The surfactant chosen is a propoxylated/ethoxylated C16–C18 fatty alcohol.

The flotation procedure above is used to evaluate the deinking performance of the polymers produced in Examples 2 and Comparative Example 4. The results are shown in the following data table.

| Polymer Sample | Amt. Added to Float Cell | Turbidity | Brightness (%) | Fiber Yield |
| --- | --- | --- | --- | --- |
| No Polymer | — | 2000 | 40 | 0.90 |
| Comp. Ex. 4 | 200 µL | 1340 | 44 | 0.74 |
| Example 2 | 200 µL | 626 | 43 | 0.68 |

The product of the inventive micellar polymerization process (Feeding hydrophobic monomer and maintaining minimal amount of surfactant in the reaction medium—Example 2) provides improved deinking performance. The added surfactant required in Comparative Example 4 reduces the effectiveness of the polymer in reducing flotation cell accept water turbidity and adds to the cost of the product.

Having described the invention in detail and by reference to the preferred embodiments thereof, it will be apparent that modifications and variations are possible without departing from the scope of the appended claims.

What is claimed is:

1. A hydrophobically modified water soluble or water dispersible polymer produced by utilizing a micellar polymerization technique comprising the steps of:

(1) providing a reaction medium including one or more water soluble or water dispersible monomers and one or more surface active agents or protective colloids;

(2) incrementally adding one or more ethylenically unsaturated monomers having hydrophobic properties to said reaction medium;

(3) initiating polymerization of said one or more water soluble or water dispersible monomers with said one or more ethylenically unsaturated monomers having hydrophobic properties; and (4) continuing polymerization of said one or more water soluble or water dispersible monomers with said one or more ethylenically unsaturated monomers having hydrophobic properties while incrementally adding said one or more ethylenically unsaturated monomers having hydrophobic properties to said reaction medium.

2. The polymer according to claim 1 wherein said water soluble or water dispersible monomer comprises one or more ethylenically unsaturated monomer which contains one or more vinyl groups.

3. The polymer according to claim 2 wherein said water soluble or water dispersible monomer is selected from the group consisting of itaconic acid, crotonic acid, malonic acid, acrylic acid, methacrylic acid, maleic acid, maleic anhydride, citraconic anhydride, 2-acrylamidomethylpropanesulfonic acid, 1-allyloxy-2-hydroxypropyl sulfonic acid, acrylamide, methacrylamide, N-vinyl pyrrolidone, N-vinyl formamide, diallyldimethylammonium chloride, diallyldimethylammonium sulfate, methacrylamidopropyltrimethyl-ammonium chloride and methacryloylethyltrimethylamine and mixtures thereof.

4. The polymer according to claim 1 wherein said one or more surface active agents is selected from the group consisting of nonionic surfactants, anionic surfactants, cationic surfactants, amphoteric surfactants, zwitterionic surfactants, poly[vinyl alcohol], hydroxyethyl cellulose, poly[vinyl pyrrolidone], sodium polyacrylate and condensation products of polyethylene glycol with fatty acids, long chain alkylene or polyhydroxy fatty acids, and mixtures thereof.

5. The polymer according to claim 1 wherein said ethylenically unsaturated monomer having hydrophobic properties is selected from the group consisting of styrene, acetoacetoxyethylmethacrylate, vinyl acetate, alkyl or alkylaryl alcohol esters of acrylic or methacrylic acid, butadiene, vinyl chloride, acrylonitrile, 1-vinylnaphthalene and p-methoxystyrene and mixtures thereof.

6. The polymer according to claim 1 wherein the amount of surface active agent present in the reaction medium comprises between about 0.1 to about 5.0 percent by weight of said reaction medium.

7. The polymer according to claim 1 weight ratio of water soluble or water dispersible monomers to ethylenically unsaturated monomers having hydrophobic properties is at least greater than 55:45.

8. The polymer according to claim 1 wherein the reaction medium in step (1) does not initially include any ethylenically unsaturated monomers having hydrophobic properties.

9. The polymer according to claim 1 wherein said polymerization reaction in step (4) occurs at a temperature between about 20° C. to about 200° C.

10. The polymer according to claim 1 wherein said water soluble or water dispersible monomer comprises diallyldimethylammonium chloride, said surface active agent comprises sodium lauryl sulfate and said one or more any ethylenically unsaturated monomers having hydrophobic properties comprises a mixture of acrylamide and lauryl methacrylate.

11. The polymer according to claim 1 wherein said water soluble or water dispersible monomer comprises diallyldimethylammonium chloride, said surface active agent comprises tallow amine ethoxylate (15 moles EO) and said one or more any ethylenically unsaturated monomers having hydrophobic properties comprises a mixture of isodecyl methacrylate, lauryl methacrylate and lauryl acrylate.

12. A rheology modification chemical, deinking chemical, cosmetic or personal care composition, foam enhancing composition, coating composition, water treatment composition, nanolithography chemical, nanofabrication chemical, control release composition, binder composition, dispersant composition or biologically active compositions including a hydrophobically modified water soluble or water dispersible polymer produced by utilizing a micellar polymerization technique comprising the steps of:

(1) providing a reaction medium including one or more water soluble or water dispersible monomers and one or more surface active agents or protective colloids;

(2) incrementally adding one or more ethylenically unsaturated monomers having hydrophobic properties to said reaction medium;

(3) initiating polymerization of said one or more water soluble or water dispersible monomers with said one or more ethylenically unsaturated monomers having hydrophobic properties; and (4) continuing polymerization of said one or more water soluble or water dispersible monomers with said one or more ethylenically unsaturated monomers having hydrophobic properties while incrementally adding said one or more ethylenically unsaturated monomers having hydrophobic properties to said reaction medium.

13. The chemical or composition according to claim 12 wherein said water soluble or water dispersible monomer comprises one or more ethylenically unsaturated monomer which contains one or more vinyl groups.

14. The chemical or composition according to claim 13 wherein said water soluble or water dispersible monomer is selected from the group consisting of itaconic acid, crotonic acid, malonic acid, acrylic acid, methacrylic acid, maleic acid, maleic anhydride, citraconic anhydride, 2-acrylamidomethylpropanesulfonic acid, 1-allyloxy-2-hydroxypropyl sulfonic acid, acrylamide, methacrylamide, N-vinyl pyrrolidone, N-vinyl formamide, diallyldimethylammonium chloride, diallyldimethylammonium sulfate, methacrylamidopropyltrimethyl-ammonium chloride and methacryloylethyltrimethylamine and mixtures thereof.

15. The chemical or composition according to claim 12 wherein said one or more surface active agents is selected from the group consisting of nonionic surfactants, anionic surfactants, cationic surfactants, amphoteric surfactants, zwitterionic surfactants, poly[vinyl alcohol], hydroxyethyl cellulose, poly[vinyl pyrrolidone], sodium polyacrylate and condensation products of polyethylene glycol with fatty acids, long chain alkylene or polyhydroxy fatty acids, and mixtures thereof.

16. The chemical or composition according to claim 12 wherein said ethylenically unsaturated monomers having hydrophobic properties is selected from the group consisting of styrene, acetoacetoxyethylmethacrylate, vinyl acetate, alkyl or alkylaryl alcohol esters of acrylic or methacrylic acid, butadiene, vinyl chloride, acrylonitrile, 1-vinylnaphthalene and p-methoxystyrene and mixtures thereof.

17. The chemical or composition according to claim 12 wherein the amount of surface active agent present in the reaction medium comprises between about 0.1 to about 5.0 percent by weight of said reaction medium.

18. The chemical or composition according to claim 12 weight ratio of water soluble or water dispersible monomers to ethylenically unsaturated monomers having hydrophobic properties is at least greater than 55:45.

19. The chemical or composition according to claim 12 wherein the reaction medium in step (1) does not initially include any ethylenically unsaturated monomers having hydrophobic properties.

20. The chemical or composition according to claim 12 wherein said polymerization reaction in step (4) occurs at a temperature between about 20° C. to about 200° C.

21. The chemical or composition according to claim 12 wherein said water soluble or water dispersible monomer comprises diallyldimethylammonium chloride, said surface active agent comprises sodium lauryl sulfate and said one or more any ethylenically unsaturated monomers having hydrophobic properties comprises a mixture of acrylamide and lauryl methacrylate.

22. The chemical or composition according to claim 12 wherein said water soluble or water dispersible monomer comprises diallyldimethylammonium chloride, said surface active agent comprises tallow amine ethoxylate (15 moles EO) and said one or more any ethylenically unsaturated monomers having hydrophobic properties comprises a mixture of isodecyl methacrylate, lauryl methacrylate and lauryl acrylate.

* * * * *